(12) United States Patent
Delmar Lissa (10) Patent No.: US 10,359,849 B2
(45) Date of Patent: Jul. 23, 2019

(54) PORTABLE COMMUNICATION DEVICE FOR TRANSMITTING TOUCH-GENERATED MESSAGES

(71) Applicant: Jose Antonio Delmar Lissa, Lima (PE)

(72) Inventor: Jose Antonio Delmar Lissa, Lima (PE)

( * ) Notice: Subject to any disclaimer, the term of this patent is extended or adjusted under 35 U.S.C. 154(b) by 0 days.

(21) Appl. No.: 15/566,107

(22) PCT Filed: Apr. 14, 2015

(86) PCT No.: PCT/PE2015/000002
§ 371 (c)(1),
(2) Date: Oct. 12, 2017

(87) PCT Pub. No.: WO2016/167672
PCT Pub. Date: Oct. 20, 2016

(65) Prior Publication Data
US 2018/0088670 A1    Mar. 29, 2018

(51) Int. Cl.
*G06F 1/32*           (2019.01)
*G06F 3/0488*         (2013.01)
(Continued)

(52) U.S. Cl.
CPC ............ *G06F 3/016* (2013.01); *G06F 3/0412* (2013.01); *G06F 3/0488* (2013.01);
(Continued)

(58) Field of Classification Search
CPC ...... G06F 1/163; G06F 1/1688; G06F 1/1694; G06F 1/3215; G06F 1/3262;
(Continued)

(56) References Cited

U.S. PATENT DOCUMENTS

| | | | | |
|---|---|---|---|---|
| 8,112,037 B2 * | 2/2012 | Ketari | ................... | H04L 63/068 455/41.1 |
| 8,312,660 B1 * | 11/2012 | Fujisaki | .................. | F41A 17/08 42/70.01 |

(Continued)

FOREIGN PATENT DOCUMENTS

| | | |
|---|---|---|
| EP | 2 626 775 A2 | 8/2013 |
| WO | WO 2014/105276 A1 | 7/2014 |

OTHER PUBLICATIONS

International Search Report and Written Opinion issued (dated Dec. 11, 2015) in corresponding International Application No. PCT/PE2015/000002.

*Primary Examiner* — Michael J Eurice
(74) *Attorney, Agent, or Firm* — Ladas & Parry LLP (57) ABSTRACT

The invention relates to a portable communication device for transmitting touch-generated messages to at least one addressee, by means of touch gestures carried out by a user on a touch-sensitive panel of the device. This device seeks to cover certain communication demands that are not satisfied by smartphones and their accessory devices; in particular, for those persons who are not in the capacity or condition to access or properly use existing products, either permanently or momentarily. In that sense, this invention provides a portable communication device, whose construction and functional characteristics are responsive to an optimum balance between versatility, self-sufficiency and accessibility, so that a personalized communication language is established, wherein the information is transmitted in simple manner.

15 Claims, 6 Drawing Sheets

(51) Int. Cl.
*G06F 17/30* (2006.01)
*G06F 3/01* (2006.01)
*G06F 3/041* (2006.01)
*H04M 1/725* (2006.01)
*G06F 3/16* (2006.01)
*G06F 1/16* (2006.01)
*H04W 4/02* (2018.01)
*H04M 1/03* (2006.01)
*H04W 52/02* (2009.01)
*H04W 68/00* (2009.01)
*H04M 1/247* (2006.01)

(52) U.S. Cl.
CPC ...... *G06F 3/04883* (2013.01); *H04M 1/7253* (2013.01); *H04M 1/72588* (2013.01); *G06F 1/163* (2013.01); *G06F 3/041* (2013.01); *G06F 3/167* (2013.01); *H04M 1/03* (2013.01); *H04M 1/247* (2013.01); *H04M 2250/22* (2013.01); *H04W 4/02* (2013.01); *H04W 52/0254* (2013.01); *H04W 68/00* (2013.01)

(58) Field of Classification Search
CPC ........ G06F 1/3265; G06F 3/016; G06F 3/167; G06F 3/017; G06F 3/0346; G06F 3/03547; G06F 3/041; G06F 3/0412; G06F 3/0416; G06F 3/0487; G06F 3/0482; G06F 3/0488; G06F 3/04883; G06F 17/30; G06F 17/30528; G06F 21/35; G06F 21/43; G06F 2203/0383; G06F 2203/0384; G06F 2203/04102; G06F 2221/2111; H04M 1/247; H04M 1/271; H04M 1/03; H04M 1/6066; H04M 1/7253; H04M 1/72552; H04M 1/72572; H04M 1/72588; H04M 2250/10; H04M 2250/22; H04M 2250/74; H04W 4/02; H04W 4/021; H04W 4/027; H04W 4/80; H04W 52/0254; H04W 68/00
See application file for complete search history.

(56) References Cited

U.S. PATENT DOCUMENTS

| | | | | |
|---|---|---|---|---|
| 8,344,862 | B1 | 1/2013 | Donham | |
| 10,048,835 | B2* | 8/2018 | Cotier | G06F 3/0482 |
| 10,079,925 | B2* | 9/2018 | Hosoi | H04M 1/03 |
| 2001/0044588 | A1* | 11/2001 | Mault | A61B 5/0002 600/549 |
| 2003/0069002 | A1* | 4/2003 | Hunter | G09F 27/00 455/404.2 |
| 2006/0206246 | A1* | 9/2006 | Walker | G06Q 10/00 701/16 |
| 2007/0259717 | A1* | 11/2007 | Mattice | A63F 3/00157 463/36 |
| 2008/0019122 | A1* | 1/2008 | Kramer | A47G 19/025 362/154 |
| 2008/0167834 | A1* | 7/2008 | Herz | G06F 1/3203 702/150 |
| 2008/0168403 | A1* | 7/2008 | Westerman | G06F 3/04883 715/863 |
| 2010/0311488 | A1* | 12/2010 | Miller | A63F 1/12 463/16 |
| 2011/0070864 | A1* | 3/2011 | Karam | G06F 21/34 455/411 |
| 2011/0125688 | A1* | 5/2011 | Bernard | G06Q 10/00 706/28 |
| 2012/0019674 | A1* | 1/2012 | Ohnishi | G08C 17/00 348/207.1 |
| 2012/0032876 | A1* | 2/2012 | Tabe | H04B 1/3838 345/156 |
| 2012/0040759 | A1* | 2/2012 | Ito | A63F 13/428 463/37 |
| 2012/0075168 | A1* | 3/2012 | Osterhout | G02B 27/017 345/8 |
| 2012/0126940 | A1* | 5/2012 | Coggill | G06F 21/32 340/5.54 |
| 2012/0229382 | A1* | 9/2012 | Matsunaga | A63F 13/92 345/158 |
| 2012/0316471 | A1* | 12/2012 | Rahman | A61B 5/0008 600/595 |
| 2013/0106803 | A1* | 5/2013 | Tan | G06F 3/03545 345/179 |
| 2013/0111342 | A1* | 5/2013 | Alameh | G06F 3/0488 715/702 |
| 2013/0111518 | A1* | 5/2013 | Kawai | G06Q 30/0241 725/32 |
| 2013/0111579 | A1 | 5/2013 | Newman et al. | |
| 2013/0165140 | A1* | 6/2013 | Bahl | G06F 21/88 455/456.1 |
| 2013/0247117 | A1* | 9/2013 | Yamada | G08C 17/02 725/93 |
| 2013/0298208 | A1* | 11/2013 | Ayed | G06F 21/00 726/6 |
| 2013/0321373 | A1* | 12/2013 | Yoshizumi | G09G 5/00 345/211 |
| 2014/0007022 | A1* | 1/2014 | Tocino Diaz | G06F 3/017 715/863 |
| 2014/0013258 | A1* | 1/2014 | Jang | G06F 3/0488 715/770 |
| 2014/0066014 | A1* | 3/2014 | Nicholson | H04W 12/08 455/411 |
| 2014/0068010 | A1* | 3/2014 | Nicholson | B60K 35/00 709/219 |
| 2014/0101576 | A1* | 4/2014 | Kwak | G06F 3/0482 715/761 |
| 2014/0107493 | A1* | 4/2014 | Yuen | A61B 5/0205 600/473 |
| 2014/0162598 | A1* | 6/2014 | Villa-Real | H04M 1/66 455/411 |
| 2014/0183269 | A1* | 7/2014 | Glaser | G06F 21/32 235/492 |
| 2014/0240088 | A1* | 8/2014 | Robinette | G08B 13/1427 340/5.61 |
| 2014/0269196 | A1* | 9/2014 | Baym | G01S 15/42 367/118 |
| 2014/0273858 | A1* | 9/2014 | Panther | A61B 5/0002 455/41.2 |
| 2014/0333543 | A1* | 11/2014 | Yanev | G06F 1/1622 345/173 |
| 2014/0378191 | A1* | 12/2014 | Hosoi | H04M 1/6066 455/575.1 |
| 2014/0379341 | A1* | 12/2014 | Seo | G10L 15/22 704/246 |
| 2015/0015499 | A1* | 1/2015 | Park | G06F 3/041 345/156 |
| 2015/0033193 | A1* | 1/2015 | Beaurepaire | G06F 3/04845 715/863 |
| 2015/0067602 | A1* | 3/2015 | Bernstein | G06F 3/0488 715/823 |
| 2015/0073907 | A1* | 3/2015 | Purves | G06Q 20/32 705/14.58 |
| 2015/0077234 | A1* | 3/2015 | Fullam | G09B 21/003 340/407.1 |
| 2015/0120551 | A1* | 4/2015 | Jung | G06Q 20/389 705/44 |
| 2015/0192777 | A1* | 7/2015 | Bae | G02B 27/0172 345/175 |
| 2015/0212647 | A1* | 7/2015 | Kim | G02B 27/017 345/173 |
| 2015/0220299 | A1* | 8/2015 | Kim | G06F 3/0488 345/1.3 |
| 2015/0294631 | A1* | 10/2015 | Jung | G06Q 10/00 345/212 |
| 2015/0313496 | A1* | 11/2015 | Connor | A61B 5/0476 600/301 |

(56) References Cited

U.S. PATENT DOCUMENTS

| | | | | |
|---|---|---|---|---|
| 2015/0324113 | A1* | 11/2015 | Kapp | G06F 3/04883 715/863 |
| 2015/0324570 | A1* | 11/2015 | Lee | G06K 9/3208 382/124 |
| 2015/0332031 | A1* | 11/2015 | Mistry | G06F 21/316 726/19 |
| 2015/0350134 | A1* | 12/2015 | Yang | H04L 51/063 709/206 |
| 2015/0350143 | A1* | 12/2015 | Yang | G06F 3/0482 345/173 |
| 2015/0356289 | A1* | 12/2015 | Brown | G06F 21/44 726/7 |
| 2015/0356749 | A1* | 12/2015 | Son | G01C 21/3667 701/454 |
| 2016/0048161 | A1* | 2/2016 | Carceroni | G06F 1/163 361/679.03 |
| 2016/0109954 | A1* | 4/2016 | Harris | G06F 3/017 345/156 |
| 2016/0134737 | A1* | 5/2016 | Pulletikurty | G06F 3/0227 715/735 |
| 2016/0147292 | A1* | 5/2016 | Sunwoo | G06F 1/1647 713/323 |
| 2016/0189679 | A1* | 6/2016 | Lomotan | G09G 5/12 345/156 |
| 2016/0247324 | A1* | 8/2016 | Mullins | G06F 3/012 |
| 2016/0259488 | A1* | 9/2016 | Chan | G06F 1/163 |
| 2016/0328023 | A1* | 11/2016 | Mistry | G06F 3/014 |
| 2016/0360488 | A1* | 12/2016 | Kapoor | H04W 52/0264 |
| 2017/0231058 | A1* | 8/2017 | Sadwick | H05B 33/0857 |
| 2018/0074571 | A1* | 3/2018 | Cronin | G06F 1/163 |
| 2018/0088686 | A1* | 3/2018 | Zuber | G06F 3/0383 |
| 2018/0220903 | A1* | 8/2018 | LeBoeuf | A61B 5/0059 |
| 2018/0350144 | A1* | 12/2018 | Rathod | H04W 4/029 |

* cited by examiner

PORTABLE COMMUNICATION DEVICE FOR TRANSMITTING TOUCH-GENERATED MESSAGES

CROSS-REFERENCE TO RELATED APPLICATION(S)

This application is the National Stage entry under 35 U.S.C. § 371 of International Application No. PCT/PE2015/000002 filed on Apr. 14, 2015, published on Oct. 20, 2016 under Publication Number WO 2016/167672, which is hereby incorporated herein by reference in its entirety.

TECHNICAL FIELD

The present invention falls within the scope of the technological sector of portable communication devices for the transmission of tactile messages, made on a touch panel, towards one or more recipients.

BACKGROUND

The technological advance in the areas of sensors, processors, micro controllers, actuators, transmission means, among others, has greatly favored the development of portable multipurpose communication devices, to the extent that the effort to be performed on a daily does no longer consist on obtaining information, but to discriminate the information that is valuable.

However, despite all of the technological advance, there still exists unsatisfied demands of communication. In particular, these demands are associated with people who are not found with the capacity or condition to access or to use adequately the currently existing products, either permanently or momentarily. Thus, to mention some examples, we have small children (particularly between 3 and 9 years old), elderly people (particularly from 75-80 years old), illiterate persons, persons with a physical incapacity, persons in emergency situation, or persons that due to their activities cannot attend visually or audibly the requirements demanded by these devices, as it is known that these privileges the senses of sight and hearing.

The unsatisfied demand to which we refer is not irrelevant, since the need for information in these cases overcomes the other scenarios every time the need to exchange of information is oriented to people with some type of limitation, leaving them with permanent gaps of information which many times deprives them of taking the best decisions (or it makes them to continue acting on the basis of decisions adopted with outdated information) at critical times. Sometimes, as it is everyone's knowledge, this gap of information can result in severe and irreparable damages.

In that sense, some initiatives have emerged to overcome some of the limitations that these portable multipurpose devices may present. However, many of these initiatives, more than being directed towards providing an alternative product, constitute a complementary and dependent product, that works in a cooperative manner with these portable multipurpose devices or that offer incomplete solutions that result inadequate, which ends not being a solution to the technical problem raised.

GENERAL DESCRIPTION

The overall objective of the present invention is to provide a portable communication device, whose construction and functional characteristics are responsive to an optimum balance between versatility, self-sufficiency and accessibility, so that a personalized communication language is established, in order for the information to be transmitted in a simple and easy manner In that sense, one of the specific objectives consists in providing a portable communication device for transmitting tactile messages, through touches made by the user on a touch panel of the device, towards at least one recipient. The portable device has a casing to house electronic components, a communication module for establishing a communication link with at least one other electronic device through a wireless communication network, a power supply of high duration energy, responsible for powering the electronic components, a touch panel having a set of tactile input sensors, at least one sensory output that has for providing information to the user, as well as a locating module for determining the geographical position of the portable device at a given time.

In addition, the portable device has a data storage unit for storing pre-established touch patterns, a list of contacts, a list of predetermined messages, a list of predetermined actions, and messages received from other electronic devices, where each one of the previously set touch patterns is associated with at least one contact of the contact list, to a message from the list of predetermined messages, and at least one action of the list of predetermined actions. Also, the portable device has a processing module in communication with the communication module, the touch panel, at least one sensory output means, the location module and the data storage unit, wherein said processing module is configured to:

Detecting, by means of the signals originated by the set of touch input sensors, touches on the touch panel.

Determining whether said touches correspond to any of the previously set touch patterns stored in the data storage unit.

Perform, in response to a positive determination of one of the previously established touch patterns, the action associated with said touch pattern, wherein each action corresponds to a group given by: activating/deactivating at least one sensory output means, activating/deactivating the location module, obtaining the geographical position from the location module, attaching the geographical position obtained to the message associated with said touch pattern, and sending the message associated with said touch pattern, via the communication module, to at least one other electronic device corresponding to the contact(s) associated with said touch pattern.

Receiving, via the communication module, a message from another electronic device.

Reveal, via at least one sensory output means, the message received from another electronic device.

In another aspect of the invention, the portable communication device for transmitting tactile messages also counts with a mechanism for placing the device in different garments, straps, backpacks, suitcases, among others, in order to be close to the user. Also, in another aspect of the invention, the casing of the portable communication device for transmitting tactile messages is cooperatively coupled with an accessory to be placed on the body of the user (e.g., collar, bracelet, among others).

Additionally, in another aspect of the invention, the portable communication device for transmitting tactile messages also has an accelerometer for recording the direction of movement of the device.

Finally, in another aspect of the invention, the portable communication device for transmitting tactile messages also has a microphone, so that the user is able to record sounds in the data storage unit or send them, via the communication module, to other electronic devices.

BRIEF DESCRIPTION OF THE FIGURES

For a better understanding of the previously stated, drawings will be accompanying in which, schematically and by way of a non-limiting example, a practical case study is represented.

DETAILED DESCRIPTION

Details of at least one embodiment of the present invention are disclosed in this section, however, it should be understood that it is purely illustrative since it could be carried out in several ways; therefore, specific details disclosed in this section should not be construed as limiting, but rather as a basis for the claims and as a representative basis for teaching a person of the art of how to implement the present invention.

Figure 1:
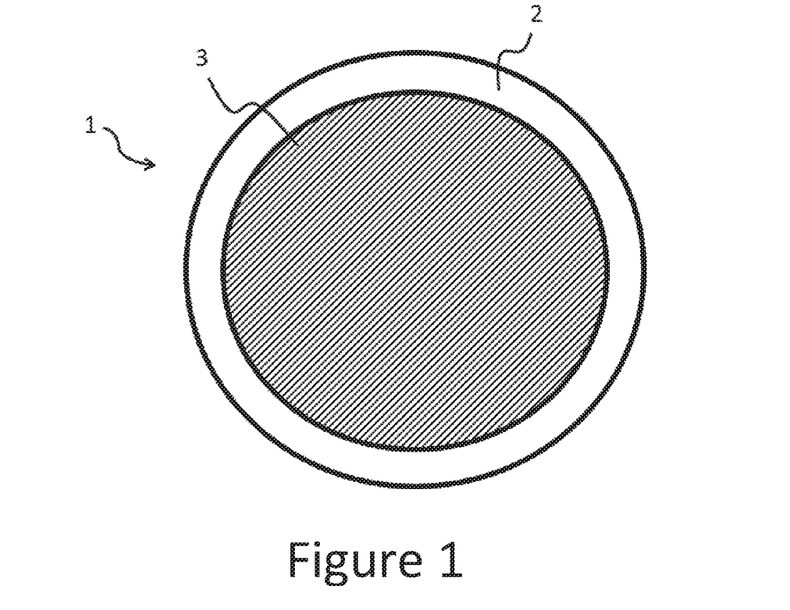
FIG. 1 shows a front view of a portable communication device for transmitting tactile messages, according to one embodiment of the present invention.
Figure 2:
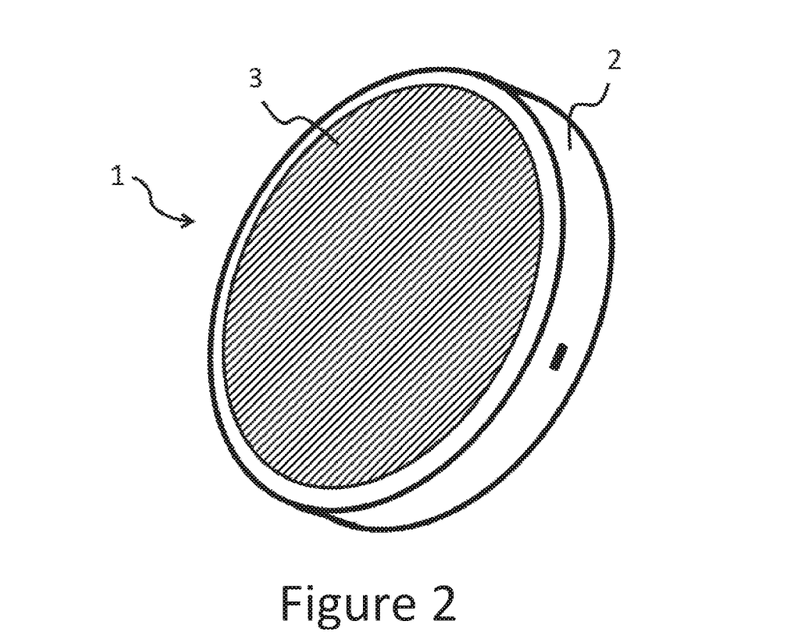
FIG. 2 shows a front isometric view of a portable communication device for transmitting tactile messages, according to one embodiment of the present invention.
Figure 3:
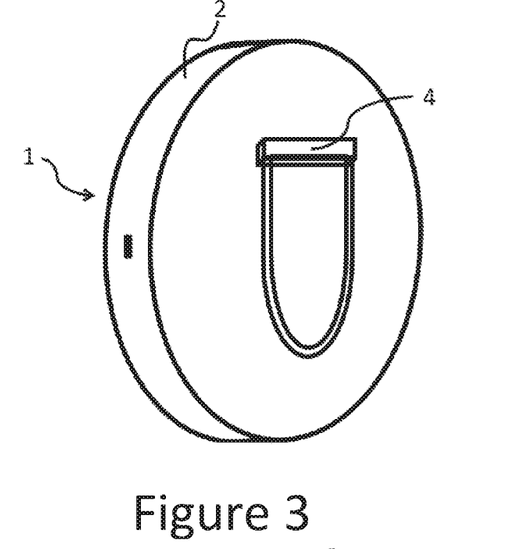
FIG. 3 shows a rear isometric view of a portable communication device for transmitting tactile messages, according to one embodiment of the present invention.

As can be seen in the FIGS. 1-2, in this embodiment, the portable communication device for transmitting tactile messages 1 has a case 2 to store the electronic components of the device, and a touch panel 3 that covers a set touch input sensors (not shown in the Figures); also, in FIG. 3, a fastening mechanism 4 is coupled to the casing 2 in order to the device can be hooked to any garment or similar. In other embodiments of the invention the casing is cooperatively coupled with a fitting to be placed on the body of the user, for example, the casing may have a hole to be used with a collar. Furthermore, it should be understood that the term casing does not necessarily refer to a rigid material casing because in some embodiments of the invention the casing may be of flexible material, so that the portable communication device for the transmission of tactile message is also flexible in this embodiment.

Figure 4:
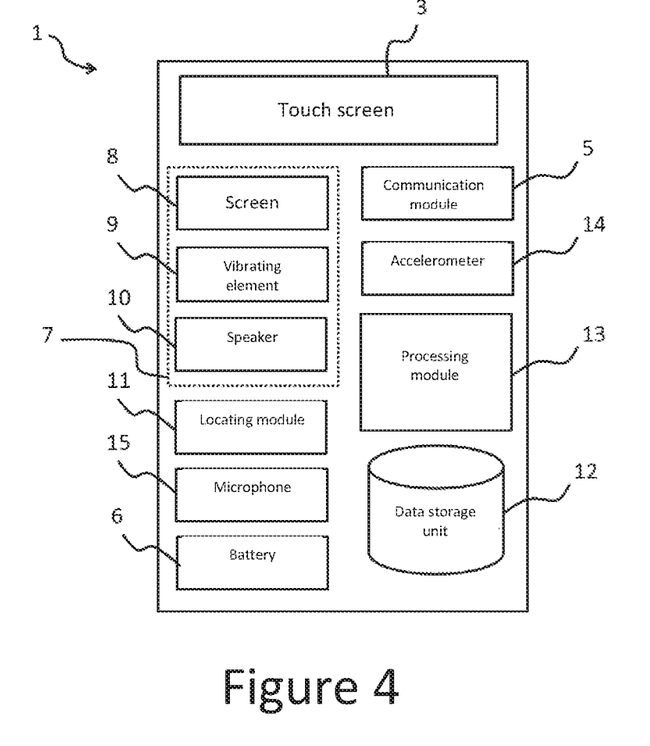
FIG. 4 shows a block diagram of a portable communication device for transmitting tactile messages, according to one embodiment of the present invention.

Referring to FIG. 4, can be seen that the portable communication device for transmitting tactile messages 1 also has a communication module 5 to establish a communication link with at least another electronic device, said module being able to establish both wireless and wired links. In case of wireless links, said module has the capacity to provide one or more links, such as: cellular telephone links, links under the IEEE 802.11 standard, links for wireless personal area networks (eg. Bluetooth®), among others. On the other hand, in case of wired links, they are directed to connect the portable device to a computer, allowing to configure some of the functionality of the device (e.g. Through a micro USB interface). Additionally, the portable device has a battery 6 which is a power source for the electronic components and at least one sensory output means 7 to reveal information to the portable device 1 user, said sensory output means being formed by at least one of the components given by: a display 8, a vibrating element 9 and a speaker 10.

In some embodiments of the invention, display 8 is an LCD display, LED, OLED or any similar display; also, in some embodiments of the invention, the touch panel 3 and the display 8 constitute a same component, a touch screen. Additionally, in other embodiments of the invention, said touch screen is a flexible touch screen.

The portable communication device for transmitting tactile messages 1 also has a locating module 11 for determining the geographical position of the device, for example, a GPS module (the Global Positioning System). A data storage unit 12 is responsible for storing pre-established touch patterns, a set of contacts, a predetermined message list, a list of predetermined actions, messages received from other electronic devices 18-19-20, and non-sent messages, wherein each of the previously set touch patterns is associated with at least one contact of the contact list, to a message from the list of predetermined messages, and at least one action of the list of predetermined actions.

Among these actions stored in the data storage unit 12, we have: activate/deactivate at least one sensory output means 7, activating/deactivating the locating module 11, obtaining the geographical position from the locating module 11, attaching the geographical position obtained to the message associated with said touch pattern, and sending the message associated with said touch pattern, via the communication module 5, to at least one other electronic device 18-19-20 corresponding to the contact(s) associated with said touch pattern.

It should be noted that the touches on the touch panel 3 correspond to touches of various types, such as: a single touch (contact in a region of the touch panel for a short period of time), held touch (contact in a region of the touch panel for an extended period of time), dragging touch (initial contact in a region of the touch panel extending to another region of the touch panel) among others. Also, the previously established touch patterns correspond, especially, to geometric figures (e.g., square, triangle, circle, among others).

Another of the essential components of the portable communication device for transmitting tactile messages 1 is the processing module 13 that is in communication with the communication module 5, the touch panel 3, at least one sensory output means 7, the locating module 11 and the data storage unit 12.

The portable communication device for transmitting tactile messages 1 also has an accelerometer 14 in communication with the processing module 13, for recording the direction of movement of the device 1. In that direction, the data storage unit 12 also stores pre-established motion patterns, which are also associated with at least one contact of the contact list, to a message from the list of predetermined messages, and at least one action of the list of predetermined actions.

In this embodiment of the invention (FIG. 4), a microphone 15 is incorporated into the portable device 1, so that the user is able to record sounds in the data storage unit 12 or send them, via communication module 5, to other electronic devices 18-19-20.

Figure 5:
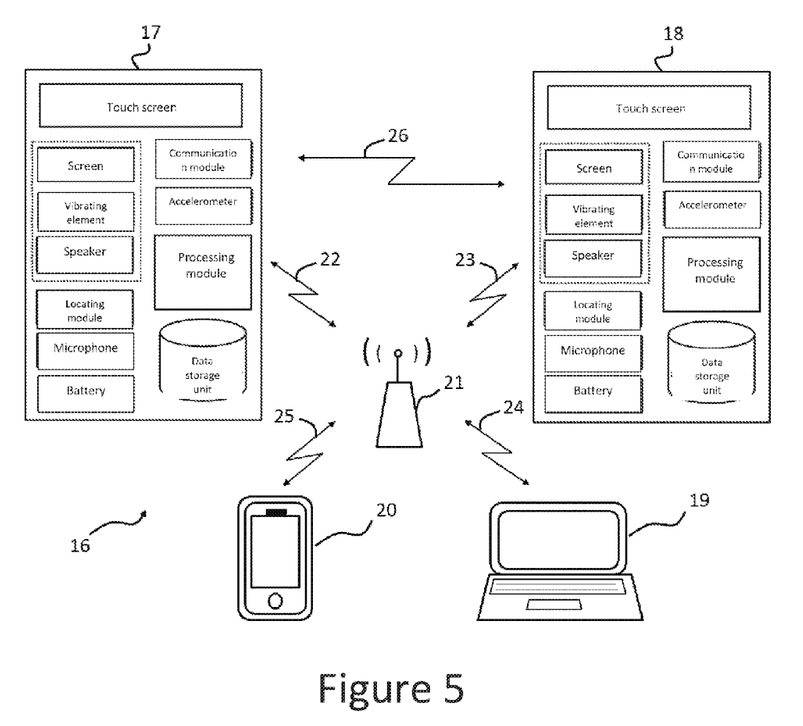
FIG. 5 shows a block diagram of the communication system, without a server, of a portable communication device for transmitting tactile messages, according to one embodiment of the present invention.

In relation to FIG. 5, a communication system 16 comprising a first portable device 17 and a second portable device 18 can be seen, both devices being portable communication devices for transmitting tactile messages 1. The system comprises other electronic devices, such as a laptop 19 and a smart phone 20, although it is obvious that other electronic devices may also form part of system 16, including more portable communication devices for transmitting tactile messages 1. A wireless communication network 21 is responsible for establishing communication between the electronic devices 17-18-19-20 of the system 16 through the communication links 22-23-24-25. However, it is also possible to establish direct communication between the portable devices 17-18, this is given through a link 26 for wireless personal area networks, such as, for example, Bluetooth®.

Figure 6:
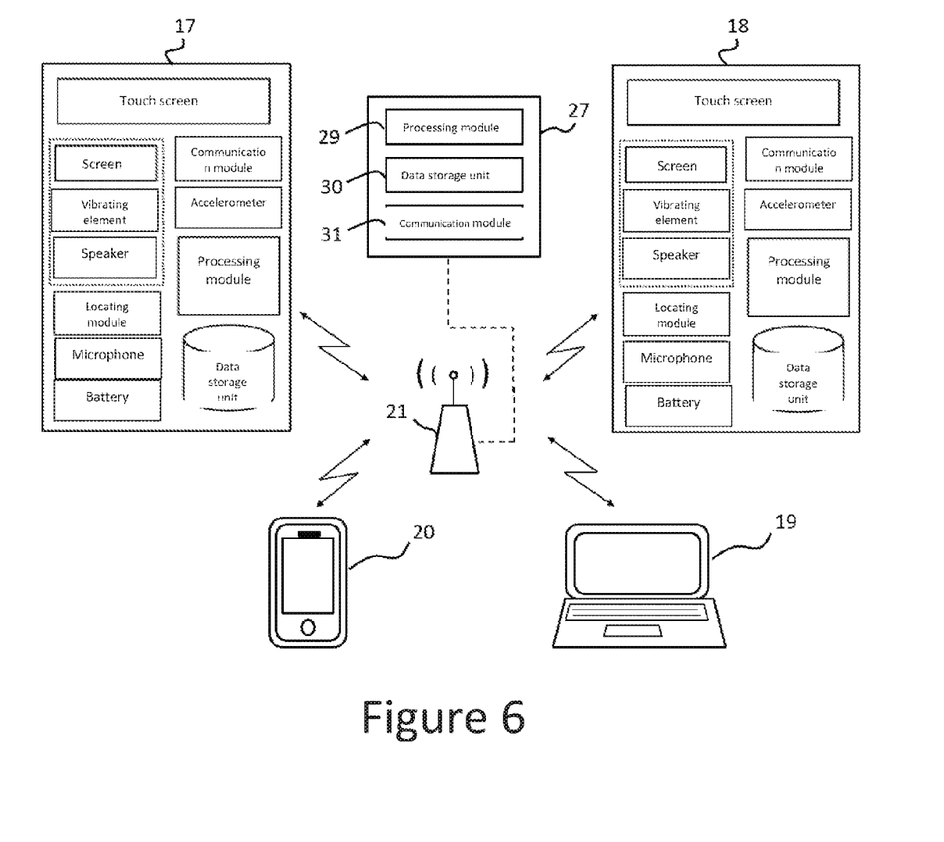
FIG. 6 shows a block diagram of the communication system, with a server connected to the wireless communication network, a portable communication device for transmitting tactile messages, according to one embodiment of the present invention.

FIG. 6 corresponds to the same communication system of FIG. 5, but where the wireless communication network 20 is further connected to a server 27, being that server 27 is capable of monitoring all of the active portable devices and the messages sent, trying to trace trends, optimizing processes, among others.

Figure 7:
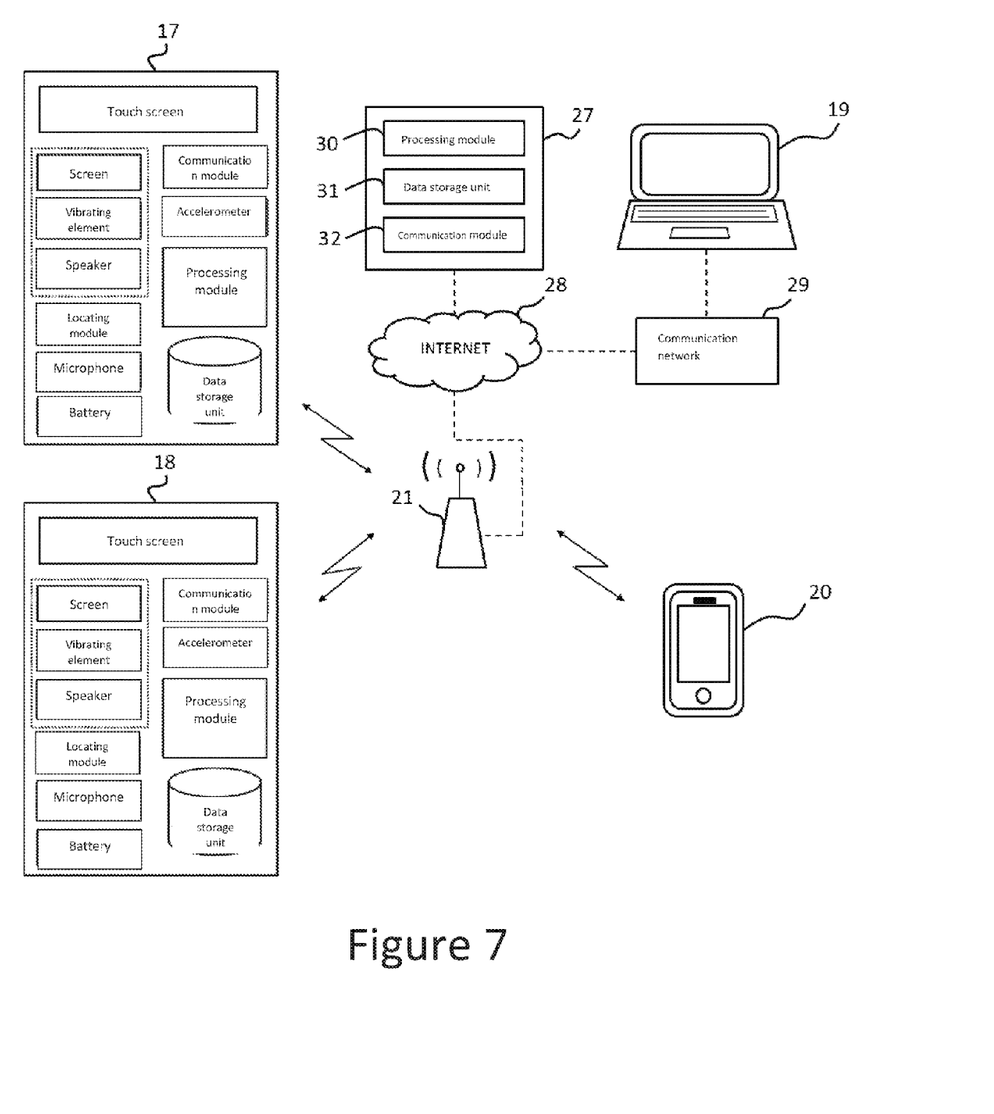
FIG. 7 shows a block diagram of the communication system, with a server connected to the internet, of a portable communication device for transmitting tactile messages, according to one embodiment of the present invention.

FIG. 7 presents the same scheme of FIG. 6, with the difference that, in this embodiment, server 27 is connected to the wireless communication network 21 via internet 28, it is understood that any device that has access to the internet has the possibility of establishing communication with any portable device 17-18. Thus, laptop 19 rather than establishing a communication link with wireless communication network 21, is connected to communication network 29 with access to the internet 28. In both embodiments of the invention (FIG. 6 and FIG. 7), the server has a processing module 30, a data storage unit 31 and a communication module 32.

In some embodiments of the invention, the other electronic devices 19-20 receive/send messages from/to portable devices 17-18 in the form of SMS (Short Message Service) or e-mail. In other embodiments of the invention, this is done through a mobile application or a web application.

Figure 8:
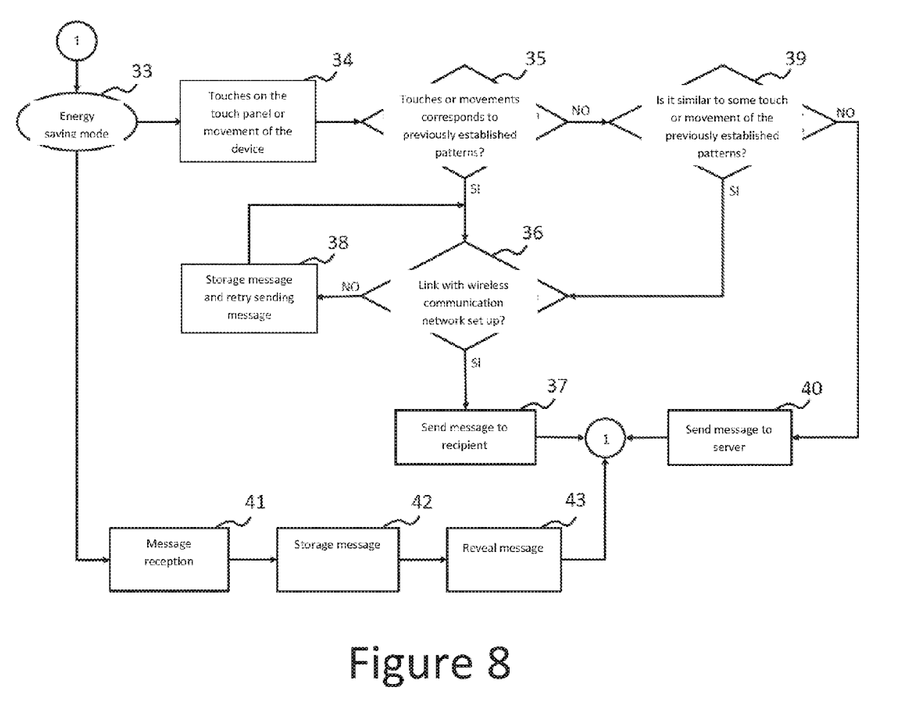
FIG. 8 shows a flow diagram of the operation of a portable communication device for transmitting tactile messages, according to one embodiment of the present invention.

In relation to FIG. 8, in this embodiment, the portable communication device for transmitting tactile messages 1 has an energy saving mode 33, it holds the portable device 1 in a suspension state until its activation, allowing a long duration of the power supply. During said suspension state, the processing module 13 deactivates one or more of the components of the portable device 1, activating them again by registering some type of activity (e.g. touch the touch panel 3). So that when processing module 13 detects, by means of the signals originated by the set of input sensors, touches on the touch panel or, by means of the signals originated by the accelerometer 14, changes in the direction of movement of the portable device 1 (activity 34), the portable device 1 exits the energy saving mode 33. Then, it is determined whether such touches or movements correspond to one of the touch patterns or previously set movements stored in the data storage unit 12 (activity 35). When said determination is positive, then the action or actions associated with said touch or motion pattern are performed, wherein each action corresponds to a group given by: activating/deactivating at least one sensory output means 7, activating/deactivating the location module 11, obtaining the geographical position from the location module 11, attaching the geographical position obtained to the message associated with said touch pattern, and sending the message associated with said touch pattern via the communication module, to at least one other electronic device 18, 19, 20 corresponding to the contacts associated with said touch pattern. However, prior to sending the message, the processing module 13 verifies whether a connection (link) with the wireless communication network 21 (activity 36), in which case the message is sent (activity 37); opposite case, the message is stored in the storage unit data 12 and then re-attempting to send the message (activity 38), previously verifying that there is connection with the wireless communication network 21 (activity 36). Once the message has been sent and after a certain amount of time has passed without any activity being registered, the portable device 1 returns to energy saving mode 33.

On the other hand, when at activity 35, if the determination is negative, the processing module 13 checks whether the touches or movements are similar to any of the previously set touch or motion patterns stored in the data storage unit 12 (activity 39). In this instance, if there is a similarity to any pattern of touch or motion, it will be considered that said touch or motion pattern was the one intended to be performed, proceeding in the same manner as if the determination was positive of activity 35. However, if there is no similarity, said message is sent to the Server 27 for later analysis (activity 40). In the same way, once the message has been sent and a certain time has passed without recording any activity, the portable device 1 returns to the energy saving mode 33.

Finally, the portable communication device for transmitting tactile messages 1 also exits the mode of energy saving 33 by receiving a message from another electronic device 18-19-20 (activity 41), in which case the processing module 13 stores the message in the data storage unit 12 (activity 42), to then reveal said message to the user of the portable device 1 (activity 43), via at least one sensory output means 7. Once the received message has been serviced and a determined time has expired without registering any activity, the portable device 1 returns to the energy saving mode 33.

In general, it should be clear, for any connoisseur in the matter, that if any message has been sent or serviced, some activity is recorded (touches, movements, receipt of the message), the portable device 1 does not enter the energy saving mode 33, but continues with the above described activities.

The invention claimed is:

1. A portable communication device for transmitting tactile messages, through touches made by a user on a touch panel of the device, to at least one recipient, wherein the portable communication device comprises the following components:
(a) a casing;
(b) a communication module for establishing a communication link with one or more electronic devices other than the portable communication device through a wireless communication network;
(c) a power supply for powering electronic components of the portable communication device;
(d) a touch panel having a set of tactile input sensors; at least one sensory output means for providing information to the user of the portable communication device; a locating module for determining a geographical position of the portable communication device;

(e) a data storage unit for storing a plurality of pre-established touch patterns, a list of more than one contact, a predetermined message list, a predetermined list of actions, and messages received from the one or more electronic devices, wherein each of the pre-established touch patterns is associated with at least one contact of the contact list, with a message from the list of predetermined messages, and with at least one action of the list of predetermined actions;

(f) a processing module in communication with the communication module, the touch panel, at least one sensory output means, the locating module, and the data storage unit, wherein said processing module is configured to:

detect, by means of the signals originated by the set of touch input sensors, touches on the touch panel; and determining whether a touch on the touch panel corresponds to one of the pre-established touch patterns stored in the data storage unit and, if so, to perform, in response to a positive determination of one of the pre-established touch patterns, both of the following actions: (1) sending a message from the list of predetermined messages to at least one contact of the contact list, and (2) taking one of the predetermined actions associated with said touch pattern, wherein the predetermined actions comprise:

activating or deactivating at least one sensory output means, activating or deactivating a location module, obtaining the geographical position from the location module, attaching the geographical position obtained to the message associated with said touch pattern, and sending the message associated with said touch pattern via the communication module, to the one or more electronic devices corresponding to the contacts associated with said touch pattern;

receive, via the communication module, a message from the one or more electronic devices; and indicate, via at least one sensory output means, a reception of a message from the one or more electronic devices, wherein each of the components (b), (c), (d), (e), and (f) is housed in the casing (a).

2. The portable communication device for transmitting tactile messages according to claim 1, wherein the pre-established touch patterns comprise geometric figures.

3. The portable communication device for transmitting tactile messages according to claim 1, wherein the processing module is further configured to:

determine whether a touch on the touch panel, which is determined not to correspond to the pre-established touch patterns, is similar to any said patterns, if the touch is determined to be similar to any said touch patterns, then treat the touch as if the touch corresponds to one of the pre-established touch patterns stored in the data storage unit, if the touch is determined not to be similar to any said patterns, then send a message including information about the touch to said server via the communication module for later analysis.

4. The portable communication device for transmitting tactile messages according to claim 1, wherein the processing module is configured to verify, before sending a message, if the communication has established connection to the wireless communication network, in which case said message is to be sent, if not, stores the message in the data storage unit and re attempts to send the message.

5. The portable communication device for transmitting tactile messages according to claim 1, wherein the processing module is configured to store the received messages from the one or more electronic devices, in the data storage unit.

6. The portable communication device for transmitting tactile messages according to claim 1, wherein the portable communication device comprises a microphone for recording sounds in the data storage unit or sending them, via the communication module, to the one or more electronic devices.

7. The portable communication device for transmitting tactile messages according to claim 1, wherein the housing comprises a fastening mechanism which allows the device to be engaged on different surfaces.

8. The portable communication device for transmitting tactile messages according to claim 1, wherein the housing is cooperatively coupled to a garment accessory.

9. The portable communication device for transmitting tactile messages according to claim 1, wherein the portable communication device comprises a power saving mode which holds the device in a suspended condition until its activation.

10. The portable communication device for transmitting tactile messages according to claim 1, wherein the communication module allows establishing a wireless communication link between the portable communication device and the at least one electronic device for transmitting tactile messages.

11. The portable communication device for transmitting tactile messages according to claim 1, wherein the portable communication device comprises an accelerometer for recording the direction of movement of the device.

12. The portable communication device for transmitting tactile messages according to claim 11, wherein the data storage unit stores a list of pre-established motion patterns, wherein each of these motion patterns is associated with at least one contact of the list, to a message from the list of predetermined messages, and the processing module is configured to: detect, by means of the signals originated by the accelerometer, change in the direction of movement of the portable device; determine whether said movement corresponds to any of the pre-established motion patterns; and execute, in response to a positive determination of one of the pre-established motion patters, the action or actions associated with said motion pattern.

13. The portable communication device for transmitting tactile messages according to claim 1, wherein said at least one sensory output means comprises at least one of the components given by: a display, a vibrating element and a speaker.

14. The portable communication device for transmitting tactile messages according to claim 13, wherein the touch panel and the display form the same component: a touch screen.

15. The portable communication device for transmitting tactile messages according to claim 14, wherein the touch screen is a flexible touch screen.

* * * * *